Sept. 6, 1955  L. M. MIXTER  2,716,827
FLORAL DISPLAY PIECE
Filed Sept. 6, 1950
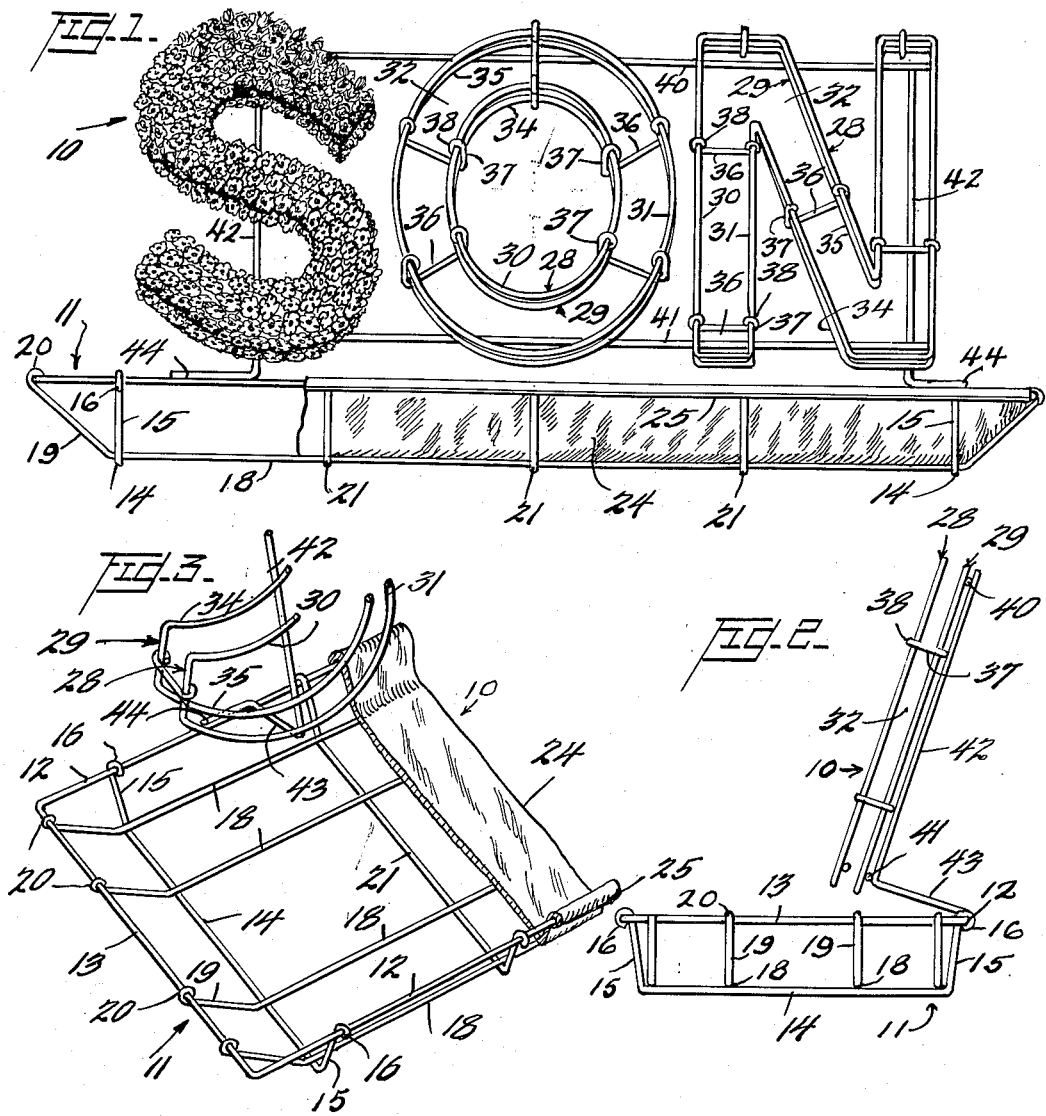
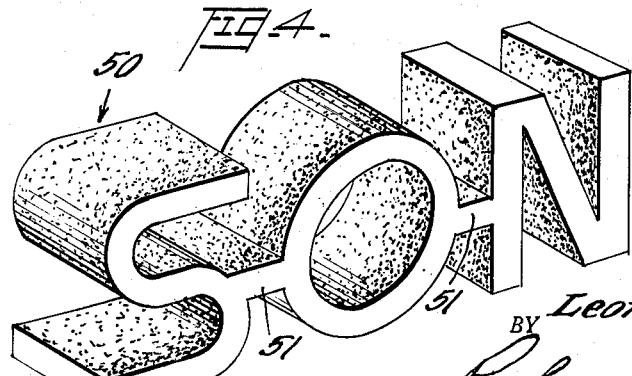
INVENTOR.
BY Leona M. Mixter,
Parker and Walsh.
Attorneys

United States Patent Office 2,716,827
Patented Sept. 6, 1955

2,716,827

FLORAL DISPLAY PIECE

Leona M. Mixter, Binghamton, N. Y.

Application September 6, 1950, Serial No. 183,440

2 Claims. (Cl. 41—12)

This invention relates to a floral display piece, and more particularly to a display piece especially for use on caskets at funerals as a tribute to a deceased member of a family.

An important object of the present invention is to provide a novel frame for a floral piece, particularly intended for use at funerals, wherein the specific relationship of the deceased person may be spelled out florally, for example, "son," "mother," etc.

A further object is to provide a novel type of framing in which floral picks may be inserted in a suitable penetrable base material for the connection of flowers to the frame or base, following the contour of the letters formed thereby.

A further object is to provide a novel frame having portions spaced to provide for the reception of a penetrable material such as moss or the like, and wherein the space thus provided is wholly open at the front for the easy insertion of the penetrable material to thus form a solid letter into the penetrable material of which florists' picks may be inserted to fix flowers in position in a mass taking the shape of the letter, thus facilitating the spelling out of the relationship of a deceased person.

A further object is to provide a novel structure of the general character referred to supported by and in novel relationship to a base structure which also may be used for the reception of flowers and which may be suitably lined with water-proof material beneath the sign spelling out the name of the deceased person, the water-proof material permitting the flowers to be sprayed and serving as a pan to catch drippings of water.

Other objects and advantages of the present invention will become apparent during the course of the following description.

In the drawing, I have shown two embodiments of the invention. In this showing,

Figure 1 is a front elevation of one form of the invention shown partially completed as a floral piece, parts being broken away, Figure 2 is an end elevation of the base structure of the entire device, Figure 3 is a fragmentary perspective view of a portion of the device, parts being broken away, and Figure 4 is a perspective view of a modified type of base sign unit.

Referring to Figures 1, 2 and 3, the numeral 10 designates in its entirety a floral sign structure, partially completed, and supported in a manner to be described over a base or tray structure, indicated as a whole by the numeral 11. The tray structure is preferably formed of wire elements as shown, including an upper rectangular frame having parallel front and back elements 12 and end elements 13. Transverse connecting wires 14 are connected between the wires 12 inwardly of the ends of the upper rectangular frame, the ends of the wires 14 being turned upwardly as at 15 and having their extremities tightly looped as at 16 around the wires 12, as clearly shown in Figure 3. The bottom or the base of the tray 11 is formed of a series of parallel wires 18, extending longitudinally of the tray and turned upwardly at the wires 14 at an angle as at 19 for connection as at 20 with the end wires 13. The wires 18 may lie above the wires 14, as shown, or beneath such wires, as may be preferred, and these wires at their crossing points are preferably spot welded. Intermediate the ends of the tray, additional cross wires 21, preferably shaped the same as the wires 14, are connected between the wires 12 and preferably spot welded to the wires 18.

The tray or base is lined as at 24 with a sheet of waterproof material, such as aluminum foil or the like. This sheet of material may be formed into the shape of the tray as suggested in Figures 1 and 3, and the edges of the sheet may be turned as at 25 around the wires 12 and 13. The sheet 24 is preferably of water-proof material for a reason which will become apparent.

The floral display sign 10 preferably is formed in the shape of a series of letters spelling out the relationship of a deceased person, for example "son," as shown in Figure 1. In the preferred form of the invention shown in Figure 1, each letter is formed of front and back frame members indicated as a whole by the numerals 28 and 29, and each front frame member 28 is formed of wires 30 and 31 spaced from each other preferably throughout their lengths so that the spaces 32 within the letters are open from the front of the letters for the packing into the letters of a penetrable material such as moss, used in the making of floral pieces, as is well known. The back frame members 29 of the letters are similarly formed of wires 34 and 35, spaced in the same manner as the front wires 30 and 31, but fixed with respect to each other by cross wires 36 bent as at 37 to extend to the wires of the front frame member for connection therewith as at 38 by being turned therearound. Accordingly, the back wire members 34 and 35 are fixed to each other by the cross wires 36, and the ends 37 of the same wires support in proper position the front wires 30 and 31. The cross wires 36 form a backing initially to support the moss or other penetrable material packed in the spaces 32.

Across the backs of the letters, spot welded to the letters and fixing them to each other, are upper and lower parallel connecting wires 40 and 41. Supporting wires 42 extend across and are spot welded to the wires 40 and 41, the lower ends of the wires 42 extending downwardly and rearwardly as at 43 and thence longitudinally as at 44 along the rear wire 12. The wire ends 44 are welded rigidly to the rear wires 12, and accordingly the wires 42 support the sign 10 in position, over the base or tray 11 and preferably inclined from the vertical as shown in Figure 2.

In Figure 4 of the drawing, I have shown a modified type of sign base indicated as a whole by the numeral 50. This sign base is preferably formed of the commonly employed very light aerated plastic material well known in the art and readily penetrable by florists' picks. The sign base may be formed integral with the letters connected by bars 51, and this sign base may be supported over the tray or base 11 in any suitable manner, for example by fastening the wires 42 against the rear of the base 50 or by projecting such wires through the material of the base 50.

*Operation*

In the form of the invention shown in Figures 1, 2 and 3, the wire frame elements are assembled as shown. Inasmuch as the procedure of making the finished sign is old and well known per se, it need not be illustrated or described in detail. This procedure, except as noted below, is old in the making of floral pieces such as wreaths, crosses and the like. As stated, the front wire frame members of the letters are wholly open toward the front of the sign, and the spaces 32 of the letters are packed with moistened moss or similar penetrable material. The open faces of the letters facilitate the packing of the letters with such material. The moss may be tied in by binding with copper wires in the manner done in practice in the making of conventional floral pieces. Waxed florists' paper is then wrapped around the front and rear frames of the letters to retain moisture in the moss. Florists' picks are then inserted into the moss, through the waxed paper, to combine to form massed floral letters in the manner indicated by the letter "S" in Figure 1.

The tray or base 11 similarly may be packed with moss in the bottom thereof and a blanket of flowers placed over the moss in the same manner as the flowers are attached to the letters. The flowers of the letters and those of the tray, if used therein, may be sprinkled or sprayed with water to retain them in a fresh condition, particularly prior to actual delivery, and any moisture draining from the flowers will collect on the sheet 24. The moisture accordingly is prevented from draining downwardly onto a casket, on which the present floral piece is particularly intended to be placed.

Particular attention is invited to the fact that the floral sign spells out the relationship of a deceased person to the member of the family having the floral piece placed on the casket, thus personalizing the floral piece as distinguished from the use of impersonal conventional designs such as wreaths, crosses and the like. It also will be noted that the sign piece extends over and is supported by the tray which serves not only as an adequate supporting base but also serves to catch any drippings of water used in the spraying or sprinkling of the flowers on the sign.

The form of the sign base shown in Figure 4 may be employed, if desired, and its use results in a floral piece just as attractive as that made with the form of the invention shown in Figures 1, 2 and 3. The use of the modified form of the invention, however, is not particularly advised since it is slightly more fragile and does not hold nourishing moisture for the flowers as is true of the body of moss or similar material used with the preferred form of the invention.

I claim:

1. A floral piece comprising a plurality of laterally spaced individual members each formed of laterally spaced back wires and laterally spaced front wires defining a letter, a plurality of wires connecting said back wires to each other and to said front wires, the latter being free from connection to each other so that the space within the wires of each member is wholly open at the front of such member for the insertion therein of a penetrable material, horizontally extending wires connected to the back wires of each member to support said members in predetermined relation to spell a word, whereby floral picks are insertable in the penetrable material for the connection of flowers with respect to each member to spell said word in flowers, a horizontal base of substantial area underlying said members and comprising a substantially rectangular tray-like structure formed of wire and having a front, and back and ends, means for supporting said members above said base comprising wires fixed at their upper ends to said horizontally extending wires and at their lower ends to said back of said base, and a layer of water-proof material corresponding in shape to and arranged in said tray.

2. A device constructed in accordance with claim 1 wherein portions of said supporting wires are offset inwardly from the back of said base to position said members intermediate the front and back thereof.

References Cited in the file of this patent

UNITED STATES PATENTS

| Number | Name | Date |
|---|---|---|
| 516,259 | Brueckner | Mar. 13, 1894 |
| 1,515,787 | Nishiyama | Nov. 18, 1924 |
| 1,696,221 | Tubbs | Dec. 25, 1928 |
| 1,920,551 | Daum | Aug. 1, 1933 |
| 2,186,573 | Braun | Jan. 9, 1940 |

FOREIGN PATENTS

| 19,625 | Great Britain | of 1911 |